(12) United States Patent
Konishi et al.

(10) Patent No.: US 7,522,437 B2
(45) Date of Patent: Apr. 21, 2009

(54) INVERTER CIRCUIT AND CONTROL CIRCUIT THEREOF

(75) Inventors: Yoshihiro Konishi, Hsinchu (TW); Yung-Fu Huang, Miaoli County (TW); Pao-Chuan Lin, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 11/617,566

(22) Filed: Dec. 28, 2006

(65) Prior Publication Data

US 2008/0123381 A1 May 29, 2008

(30) Foreign Application Priority Data

Nov. 28, 2006 (TW) .............................. 95143878 A

(51) Int. Cl.
*H02M 7/5387* (2007.01)
*G05F 1/00* (2006.01)

(52) U.S. Cl. ....................... 363/132; 323/290

(58) Field of Classification Search ................ 323/222, 323/225, 290, 259; 366/21, 37, 132; 363/21, 363/37, 132

See application file for complete search history.

(56) References Cited

U.S. PATENT DOCUMENTS

| 4,504,896 A | * | 3/1985 | Easter et al. ............. 363/21.18 |
| 4,757,434 A | * | 7/1988 | Kawabata et al. ............. 363/41 |
| 6,369,461 B1 | * | 4/2002 | Jungreis et al. ................ 307/46 |
| 6,373,729 B1 | * | 4/2002 | Shimazaki et al. ............ 363/37 |
| 6,429,639 B1 | * | 8/2002 | Pelly ....................... 324/117 H |
| 7,099,169 B2 | * | 8/2006 | West et al. ................... 363/132 |
| 2005/0180175 A1 | * | 8/2005 | Torrey et al. .................. 363/17 |
| 2008/0037305 A1 | * | 2/2008 | West .......................... 363/132 |

* cited by examiner

*Primary Examiner*—Jessica Han
*Assistant Examiner*—Emily Pham
(74) *Attorney, Agent, or Firm*—WPAT P.C.; Justin King

(57) ABSTRACT

An inverter circuit and a control circuit thereof for converting DC power from the renewable energy or distributed energy into AC power so as to be fed into the AC utility power system according to related regulations. The inverter circuit comprises a buck-boost inverter, a DC-to-AC inverter comprising two half-bridge inverters, and a by-pass passive switch coupled to an input DC voltage and the positive terminal of a first DC voltage. The inverter circuit of the present invention prevents the switching loss of an active switch and the energy loss of a coupled inductor by use of the by-pass passive switch and improves the efficiency of the inverter circuit by use of voltage feed-forward compensation.

7 Claims, 4 Drawing Sheets

INVERTER CIRCUIT AND CONTROL CIRCUIT THEREOF

BACKGROUND OF THE INVENTION

1. Field of the Invention

The present invention generally relates to an inverter circuit and a control circuit thereof and, more particularly, to an inverter circuit and its associated control circuit for converting DC power from the renewable energy or distributed energy into AC power so as to be fed into the AC utility power system according to related regulations.

2. Description of the Prior Art

With the development towards industrialization, the demand for electricity increases. However, the limited natural resources and the resistance of building new power plants due to the rise in environmental consciousness encourage developing the renewable energy. It has attracted considerable attention in efficiently and economically converting the renewable energy to the AC utility power system for developed countries to look after both industrialization and environmental protection.

The grid-tied power conditioner directly converts power from the renewable energy or distributed energy into AC power so as to be fed into the AC utility power system. The grid-tied power conditioner can be used as a stand-alone compact power generator so as to construct a distributed power system without a large-volume, high-cost and hard-to-maintain battery set. With the use of a net meter, the subscriber, possibly forming a residential power generating system, can even charge the power service provider. In this manner, the power generating cost can be relatively lowered so as to improve the efficiency.

The cost for power generating by using the renewable energy or distributed energy depends on the power generating techniques. Therefore, the utilization rate of the renewable energy or distributed energy can be increased if the power conversion efficiency can be improved.

Please refer to FIG. 1, which is a conventional two-stage inverter circuit. The inverter circuit comprises a buck-boost converter 11 and a DC-to-AC inverter 12 having two half-bridge inverters. The buck-boost converter 11 converts the input DC voltage with different voltage values to a fixed output DC voltage. The DC-to-AC inverter 12 converts the output DC voltage to an AC voltage. More particularly, the buck-boost converter 11 comprises an active switch $G_{11}$, a coupled inductor $L_{11}$ comprising two windings using a common iron core so that the coupled inductor $L_{11}$ can be an energy storage device, two passive switches $D_{11}$, $D_{12}$, and three capacitors $C_{11}$, $C_{12}$, $C_{13}$.connected to the coupled inductor and the DC-to-AC inverter. The DC-to-AC inverter 12 comprises two half-bridge inverters, each has two active switches $G_{12}$, $G_{13}$ (or $G_{14}$, $G_{15}$), two inductors $L_{12}$, $L_{13}$ and two capacitors $C_{14}$, $C_{15}$. The active switch $G_{11}$ is turned on so that the energy from the DC voltage $V_{11}$ is stored in the coupled inductor $L_{11}$. Since the coupled inductor $L_{11}$ has two windings using a common iron core, the energy is coupled by the iron core so that the buck-boost inverter 11 outputs two DC voltages $V_{12}$, $V_{13}$, each to be converted to an AC voltage by one of the two half-bridge inverters.

In order to improve the efficiency of the inverter circuit, the present invention provides an inverter circuit and a control circuit of the inverter circuit to prevent the switching loss of the active switch and the energy loss of the coupled inductor by use of a by-pass passive switch and improve the efficiency of the inverter circuit by use of voltage feed-forward compensation.

SUMMARY OF THE INVENTION

It is a primary object of the present invention to provide an inverter circuit using a by-pass passive switch to prevent the switching loss of an active switch and the energy loss of a coupled inductor.

It is a secondary object of the present invention to provide a control circuit for the inverter circuit to improve the efficiency of the inverter circuit by use of voltage feed-forward compensation.

In order to achieve the foregoing objects, the present invention provides an inverter circuit comprising a buck-boost converter; a DC-to-AC inverter; and a by-pass passive switch, coupled to an input DC voltage and the positive terminal of a first DC voltage.

Preferably, the buck-boost converter comprises: a coupled inductor comprising two windings using a common iron core, an active switch, connected to the input DC voltage and the coupled inductor; and two passive switches, connected to the coupled inductor and the DC-to-AC inverter.

Preferably, the active switch is an insulating gate bipolar transistor (IGBT).

Preferably, the DC-to-AC inverter comprises two half-bridge inverters and the present invention further comprises two current detectors, each disposed at a respective output terminal of the two half-bridge inverters.

The present invention further provides a control circuit of an inverter circuit, the control circuit comprising two voltage feed-forward compensation circuits, each comprising: a voltage feed-forward signal generator, for generating a voltage feed-forward signal; a current reference signal generator, for generating a current reference signal; a first adder, for receiving the voltage feed-forward signal and the current reference signal so as to generate a control command; and a pulse control signal generator, for receiving the control command so as to generate a pulse control signal.

Preferably, the voltage feed-forward signal generator comprises: a first divider, for receiving the AC utility voltage and a first half-wave voltage signal so as to generate a first half-wave modulation index; a second divider, for receiving the AC utility voltage and a second half-wave voltage signal so as to generate a second half-wave modulation index; and a selector, for receiving the first half-wave modulation index and the second half-wave modulation index so as to generate the voltage feed-forward signal according to a synchronous signal that is synchronized with the AC utility voltage.

Preferably, the current reference signal generator comprises: a second adder, for receiving an AC detected current and an AC reference current so as to generate a current reference command; and a controller, for receiving the current reference command so as to generate a current reference signal.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention providing an inverter circuit and a control circuit of the inverter circuit for converting DC power from the renewable energy or distributed energy into AC power can be exemplified by the preferred embodiment as described hereinafter.

Figure 1:
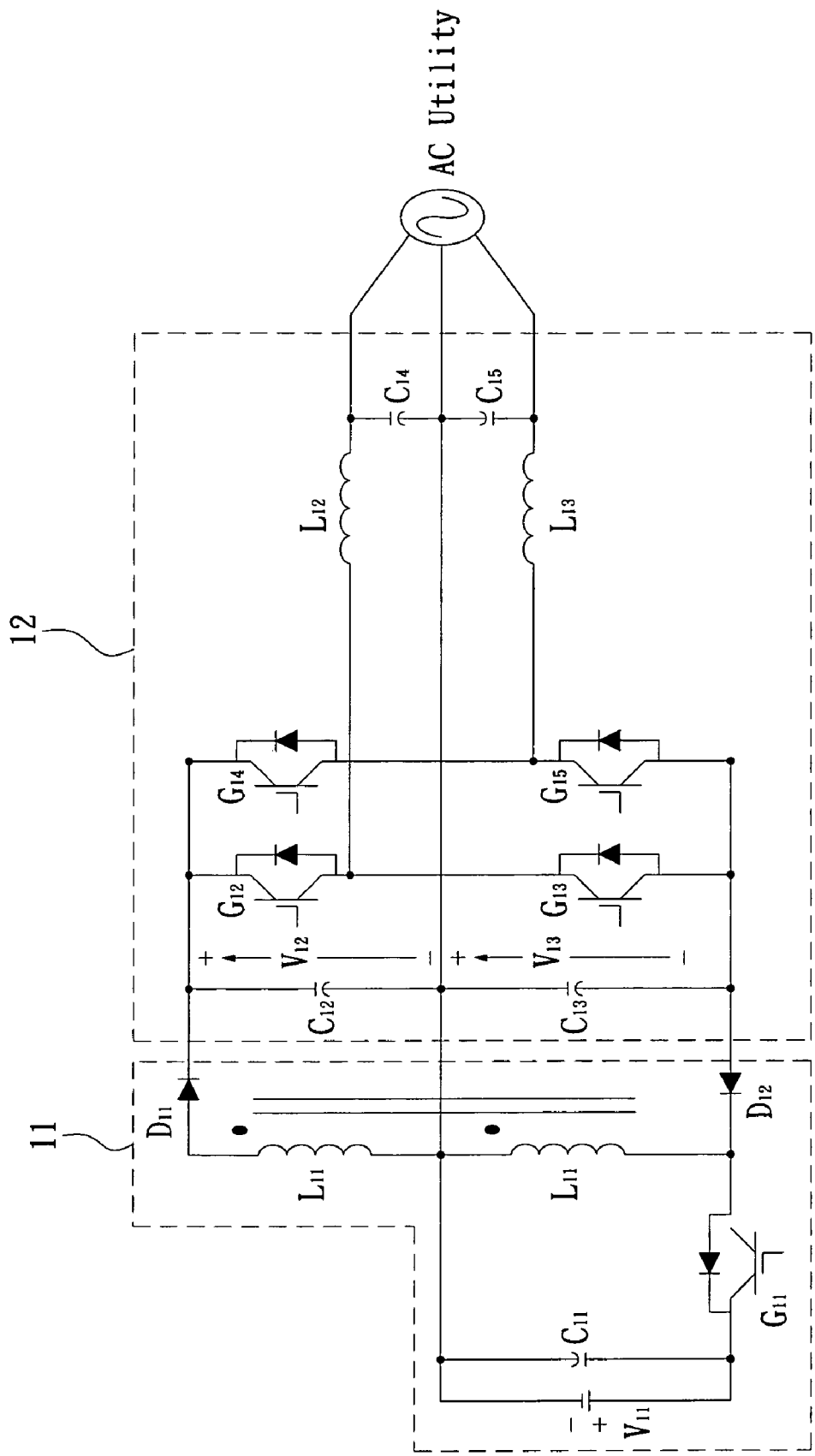
FIG. 1 is a conventional two-stage inverter circuit.
Figure 2:
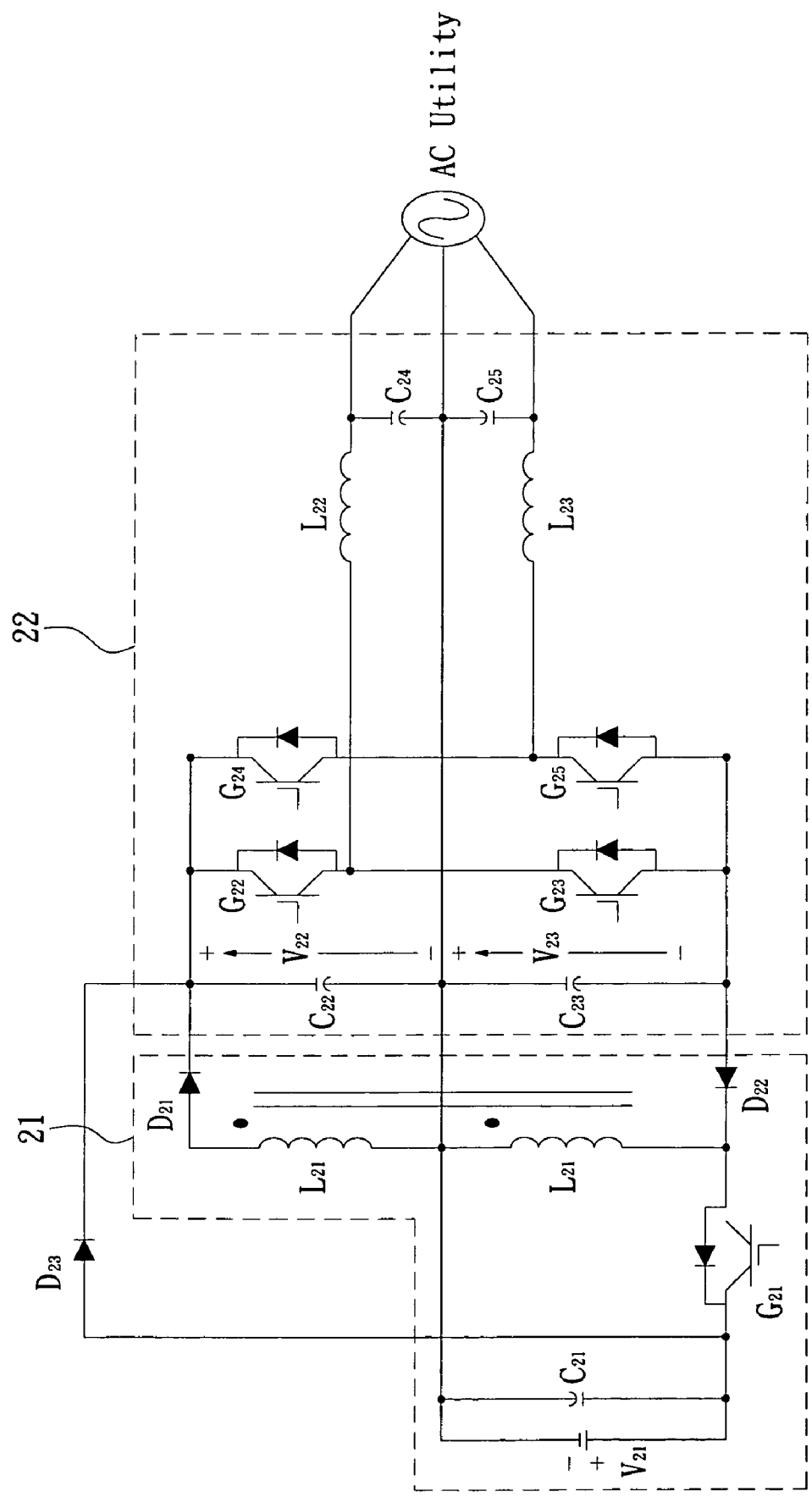
FIG. 2 is an inverter circuit according to one embodiment of the present invention.

Please refer to FIG. 2, which is an inverter circuit according to one embodiment of the present invention. The inverter circuit comprises a buck-boost converter 21, a DC-to-AC inverter 22 having two half-bridge inverters and a by-pass passive switch $D_{23}$ coupled to an input DC voltage $V_{21}$ and the positive terminal of a first DC voltage $V_{22}$ from the DC-to-AC inverter 22. The buck-boost converter 21 converts the input DC voltage with different voltage values to a fixed output DC voltage. The DC-to-AC inverter 22 converts the output DC voltage to an AC voltage. More particularly, the buck-boost inverter 21 comprises an active switch $G_{21}$, a coupled inductor $L_{21}$ comprising two windings using a common iron core so that the coupled inductor $L_{21}$ can be an energy storage device, two passive switches $D_{21}$, $D_{22}$, and three capacitors $C_{21}$, $C_{22}$, $C_{23}$. The DC-to-AC inverter 22 comprises two half-bridge inverters, each has two active switches $G_{22}$, $G_{23}$ (or $G_{24}$, $G_{25}$), two inductors $L_{22}$, $L_{23}$ and two capacitors $C_{24}$, $C_{25}$.

In the present embodiment, the active switch $G_{21}$ is an insulating gate bipolar transistor (IGBT).

The active switch $G_{21}$ is turned on so that the energy from the DC voltage $V_{21}$ is stored in the coupled inductor $L_{21}$. Since the coupled inductor $L_{21}$ has two windings using a common iron core, the energy can be stored in the winding on the primary side and coupled by the iron core into the winding on the secondary side so that the buck-boost converter 21 outputs two DC voltages $V_{22}$, $V_{23}$, each to be converted to an AC voltage by one of the two half-bridge inverters.

When the input DC voltage V21 is about to exceed the first DC voltage V22, part of a DC current flows though the by-pass passive switch D23 so as to deliver the energy into the capacitor C22 across which is the first DC voltages V22. Therefore, the coupled inductor L21 does not add energy to the first DC voltages V22 so that the power consumption of the coupled inductor L21 is reduced. On the other hand, since part of the DC current flows through the by-pass passive switch D23, the DC current flowing into the active switch G21 of the buck-boost inverter 21 is lowered so that the switching loss of the active switch G21 is reduced, which improves the power conversion efficiency.

Moreover, as the input DC voltage $V_{21}$ is about to exceed the first DC voltage $V_{22}$, the first DC voltage $V_{22}$ follows the input DC voltage $V_{21}$ because of the by-pass passive switch $D_{23}$. As a result, the buck-boost converter 21 can no longer control first DC voltage $V_{22}$ and the first DC voltage $V_{22}$ follows the input DC voltage $V_{21}$.

However, in order for the inverter circuit to output a current waveform with symmetry for the positive and negative half-waves, two voltage feed-forward compensation circuits are used. Two voltage feed-forward compensation parameters corresponding to the two DC voltages $V_{22}$ (across the capacitor $C_{22}$), $V_{23}$ (across the capacitor $C_{23}$) are calculated according to the two DC voltages $V_{22}$, $V_{23}$ and two output AC currents at the output terminals of the two half-bridge inverters so as to obtain an optimal output current waveform indicating better performance of the inverter circuit. In the present embodiment, there are provided two current detectors, each disposed at a respective output terminal of the two half-bridge inverters for detection of the output AC currents.

Figure 3:
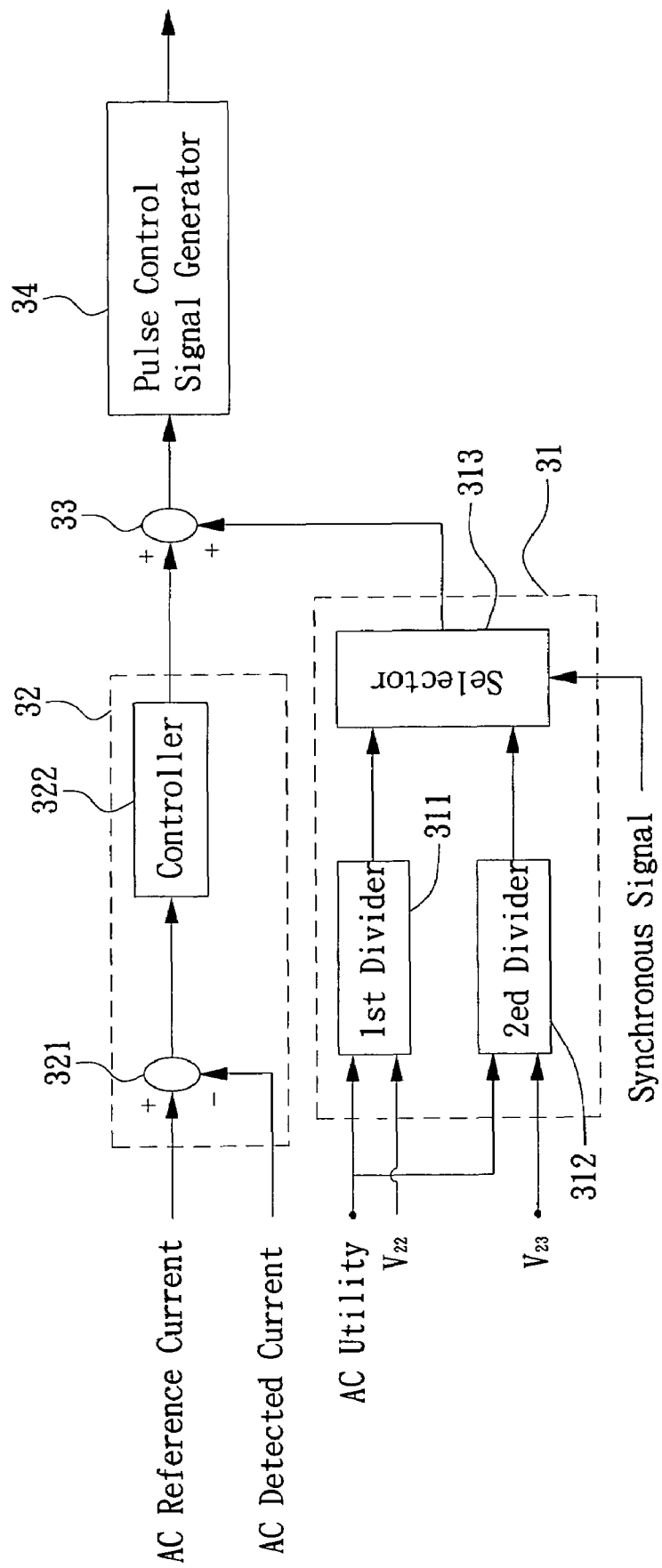
FIG. 3 is a voltage feed-forward compensation circuit of the inverter circuit of the present invention.

Accordingly, the present invention further provides a control circuit for the inverter circuit. The control circuit comprises two voltage feed-forward compensation circuits, each as shown in FIG. 3. The voltage feed-forward compensation circuit comprises: a voltage feed-forward signal generator 31, a current reference signal generator 32, a first adder 33 and a pulse control signal generator 34.

The voltage feed-forward signal generator 31 generates a voltage feed-forward signal and comprises a first divider 311, a second divider 312, and a selector 313. The first divider 311 receives the AC utility voltage and a first half-wave voltage signal so as to generate a first half-wave modulation index. The second divider 312 receives the AC utility voltage and a second half-wave voltage signal so as to generate a second half-wave modulation index. The selector 313 receives the first half-wave modulation index and the second half-wave modulation index so as to generate the voltage feed-forward signal according to a synchronous signal that is synchronized with the AC utility voltage.

The current reference signal generator 32 generates a current reference signal and; and the current reference signal generator 32 comprises a second adder 321 and a controller 322. The second adder 321 receives an AC detected current and an AC reference current so as to generate a current reference command. The controller 322 receives the current reference command so as to generate a current reference signal.

The first adder 33 receives the voltage feed-forward signal and the current reference signal so as to generate a control command. The pulse control signal generator 34 receives the control command so as to generate a pulse control signal. The pulse control signal functions as a voltage feed-forward compensation parameter.

Figure 4:
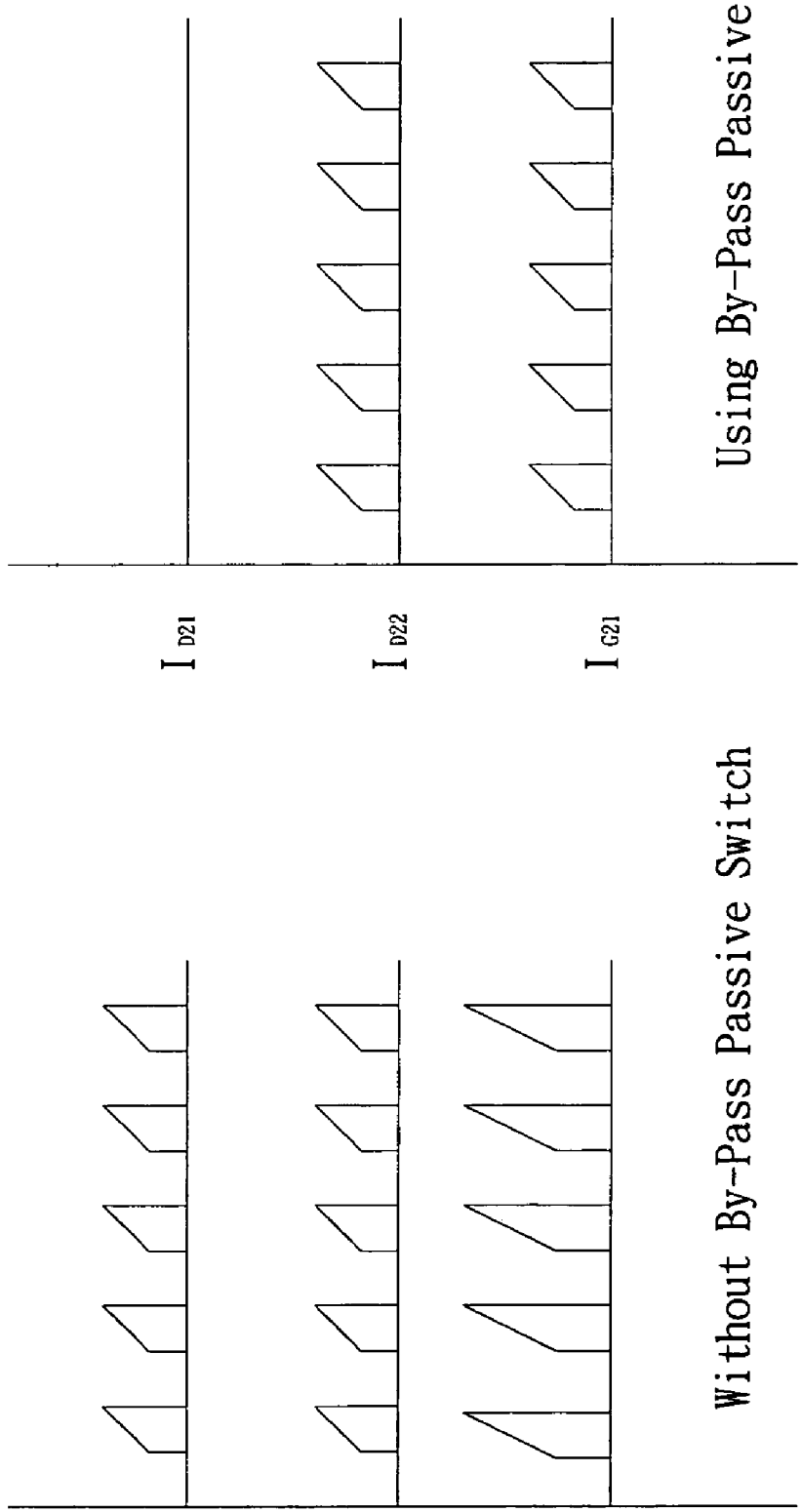
FIG. 4 is a comparison between the inverter circuit of the present invention and the inverter circuit of the prior art.

Please also refer to FIG. 4 for a comparison between the inverter circuit of the present invention and the inverter circuit of the prior art. It is obvious that the inverter circuit of the present invention uses a by-pass passive switch to obtain an optimal output current waveform indicating better performance of the inverter circuit.

According to the above discussion, it is apparent that the present invention discloses an inverter circuit and a control circuit of the inverter circuit for converting DC power from the renewable energy or distributed energy into AC power so as to be fed into the AC utility power system according to related regulations. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An inverter circuit, comprising:
   a buck-boost converter;
   a DC-to-AC inverter including a first DC voltage; and
   a by-pass passive switch, coupled to an input DC voltage and said first DC voltage's positive terminal,
   wherein said buck-boost converter comprising:
   a coupled inductor comprising two windings using a common iron core;
   an active switch, connected to said input DC voltage and said coupled inductor; and
   two passive switches, connected to said coupled inductor and said DC-to-AC inverter,
   wherein the by-pass passive switch is coupled to the active switch.

2. The inverter circuit as recited in claim 1, wherein said first DC voltage is on a capacitor.

3. The inverter circuit as recited in claim 1, wherein the active switch is an insulating gate bipolar transistor (IGBT).

4. The inverter circuit as recited in claim 1, wherein the DC-to-AC inverter comprises two half-bridge inverters.

5. The inverter circuit as recited in claim 4, further comprising two current detectors, each disposed at a respective output terminal of the two half-bridge inverters.

6. A control circuit of an inverter circuit, the control circuit comprising two voltage feed-forward compensation circuits, each comprising:
   a voltage feed-forward signal generator, for generating a voltage feed-forward signal;
   a current reference signal generator, for generating a current reference signal;
   a first adder, for receiving the voltage feed-forward signal and the current reference signal so as to generate a control command;
   a pulse control signal generator, for receiving the control command so as to generate a pulse control signal; and
   wherein said voltage feed-forward signal generator comprises:
      a first divider, for receiving the AC utility voltage and a first half-wave voltage signal so as to generate a first half-wave modulation index;
      a second divider, for receiving the AC utility voltage and a second half-wave voltage signal so as to generate a second half-wave modulation index; and
      a selector, for receiving the first half-wave modulation index and the second half-wave modulation index so as to generate the voltage feed-forward signal according to a synchronous signal that is synchronized with the AC utility voltage.

7. The control circuit as recited in claim 6, wherein the current reference signal generator comprises:
   a second adder, for receiving an AC detected current and an AC reference current so as to generate a current reference command; and
   a controller, for receiving the current reference command so as to generate a current reference signal.

* * * * *